United States Patent
Turudic

(10) Patent No.: US 12,179,558 B2
(45) Date of Patent: *Dec. 31, 2024

(54) ELECTRIC VEHICLE THERMAL MANAGEMENT AND SAFETY APPARATUS

(71) Applicant: RANCHO DEL I.P., Sheridan, WY (US)

(72) Inventor: Andy Turudic, Hillboro, OR (US)

(73) Assignee: RANCHO DEL I.P., Sheridan, WY (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/857,895

(22) Filed: Jul. 5, 2022

(65) Prior Publication Data

US 2023/0249519 A1 Aug. 10, 2023

Related U.S. Application Data

(63) Continuation of application No. 17/710,617, filed on Mar. 31, 2022, now Pat. No. 11,407,280.

(Continued)

(51) Int. Cl.
*B60H 1/03* (2006.01)
*B60H 1/00* (2006.01)
*B60L 15/02* (2006.01)

(52) U.S. Cl.
CPC ......... *B60H 1/034* (2013.01); *B60H 1/00385* (2013.01); *B60L 15/02* (2013.01); *B60L 2240/525* (2013.01); *B60L 2240/529* (2013.01)

(58) Field of Classification Search
CPC ....... B60H 1/034; B60H 1/0385; B60L 15/02; B60L 2240/525; B60L 2240/529;

(Continued)

(56) References Cited

U.S. PATENT DOCUMENTS 5,058,391 A 10/1991 Periot
5,291,960 A 3/1994 Brandenburg
(Continued)

FOREIGN PATENT DOCUMENTS

KR 10-2004-0072247 A 8/2004

OTHER PUBLICATIONS

Baba et al., "Battery Heating System for Electric Vehicles", SAE Technical Paper 2015-01-0248, Apr. 2015, 7 pages, SAE.org (online), URL: https://doi.org/10.4271/2015-01-0248.

(Continued)

*Primary Examiner* — Marc E Norman

(57) ABSTRACT

An ultra low cost electric vehicle heating apparatus, components thereof, and related method are herein described. A driver circuit operates a switching device at an intermediate state between fully-turned-off and fully-turned-on, in a high power dissipation heating mode, to efficiently produce heat energy for heating a passenger compartment, or energy storage system, of an electric vehicle. The driver circuit operates the switching device to have a fully-turned-off state and a fully-turned-on state in a main function mode for a traction inverter or an energy storage system charger of the electric vehicle. The driver circuit is operable to cycle the heating mode and the main function mode for combining such heating and such main function operation of the traction inverter, or the charger, without compromising the operation of the traction motor, or charger, while simultaneously eliminating many of the expensive resistive heating components in use by practitioners of the art.

19 Claims, 10 Drawing Sheets

Related U.S. Application Data

(60) Provisional application No. 63/308,911, filed on Feb. 10, 2022.

(58) Field of Classification Search
CPC .......... B60L 2240/545; B60L 2240/34; B60L 1/00278; B60L 1/003; B60L 1/06; B60L 1/08
See application file for complete search history.

(56) References Cited

U.S. PATENT DOCUMENTS

| | | |
|---|---|---|
| 5,483,807 A | 1/1996 | Abersfelder |
| 5,537,956 A | 7/1996 | Rennfeld |
| 5,647,534 A | 7/1997 | Kelz |
| 6,124,644 A | 9/2000 | Olson |
| 6,138,466 A | 10/2000 | Lake |
| 6,186,254 B1 | 2/2001 | Mufford |
| 6,213,233 B1 | 4/2001 | Sonntag |
| 6,347,528 B1 | 2/2002 | Iritani |
| 6,360,835 B1 | 3/2002 | Skala |
| 6,394,207 B1 | 5/2002 | Skala |
| 6,448,535 B1 | 9/2002 | Ap |
| 6,464,027 B1 | 10/2002 | Dage |
| 6,467,286 B2 | 10/2002 | Hasebe |
| 6,569,550 B2 | 5/2003 | Khelifa |
| 6,651,761 B1 | 11/2003 | Hrovat |
| 6,708,513 B2 | 3/2004 | Koehler |
| 6,743,539 B2 | 6/2004 | Clingerman |
| 6,772,603 B2 | 8/2004 | Hsu |
| 6,797,421 B2 | 9/2004 | Assarabowski |
| 7,048,044 B2 | 5/2006 | Ban |
| 7,150,159 B1 | 12/2006 | Brummett |
| 7,191,858 B2 | 3/2007 | Vanderwees |
| 7,259,469 B2 | 8/2007 | Brummett |
| 7,382,102 B2 | 6/2008 | Ashtiani |
| 7,416,310 B1 * | 8/2008 | Savicki, Jr. .......... H01H 3/0213 200/317 |
| 7,591,143 B2 | 9/2009 | Zeigler |
| 7,591,303 B2 | 9/2009 | Zeigler |
| 7,841,431 B2 | 11/2010 | Zhou |
| 10,960,785 B2 | 3/2021 | Villanueva |
| 11,407,280 B1 * | 8/2022 | Turudic ............ B60H 1/00385 |
| 2012/0065787 A1 * | 3/2012 | Broniak .................. H02J 3/14 700/287 |
| 2013/0076126 A1 * | 3/2013 | Hashimoto ............ B60L 50/61 307/9.1 |
| 2017/0047747 A1 | 2/2017 | Kufner |
| 2018/0205341 A1 | 7/2018 | Syed et al. |
| 2018/0208018 A1 | 7/2018 | Blatchley et al. |
| 2019/0165713 A1 * | 5/2019 | Namuduri ............... B60L 58/19 |
| 2020/0274375 A1 | 8/2020 | Griffiths et al. |
| 2021/0221250 A1 | 7/2021 | Hiratsuka |
| 2023/0249520 A1 * | 8/2023 | Turudic ............. B60H 1/00385 165/201 |

OTHER PUBLICATIONS

International Search Report and Written Opinion, PCT/US2023/011878, Apr. 6, 2023, 11 pages.

\* cited by examiner

Example of a 3 Phase Traction Motor Inverter

| Vector | S1 | S2 | S3 | S4 | S5 | S6 | VAB | VBC | VCA | Vector Mode |
|---|---|---|---|---|---|---|---|---|---|---|
| {000} | | | | | | | 0 | 0 | 0 | Zero |
| {100} | ON | ON | OFF | ON | OFF | OFF | +VDC | 0 | -VDC | Active |
| {100} | ON | ON | ON | OFF | OFF | OFF | 0 | +VDC | -VDC | Active |
| {010} | OFF | ON | ON | OFF | OFF | ON | -VDC | +VDC | 0 | Active |
| {011} | OFF | OFF | ON | OFF | ON | ON | -VDC | 0 | +VDC | Active |
| {001} | OFF | OFF | OFF | ON | ON | ON | 0 | -VDC | +VDC | Active |
| {101} | ON | OFF | OFF | ON | ON | OFF | +VDC | -VDC | 0 | Active |
| {111} | | | | | | | 0 | 0 | 0 | Zero |

FIG. 6

ELECTRIC VEHICLE THERMAL MANAGEMENT AND SAFETY APPARATUS

TECHNICAL FIELD

The technical field of the present disclosure relates generally to electrically propelled vehicles ("EV"), more specifically heating of electrically propelled vehicles, and operation of traction inverters and onboard chargers, and drivers for traction inverters and onboard chargers.

BACKGROUND

Electric vehicles have many variations of powertrains, which typically feature an energy storage system such as a battery or fuel cell, traction inverters or traction motor controllers, and electric motors, along with an onboard or offboard vehicle charging system. The various components of electric vehicles, their support equipment, and the passengers thereof, have various heating and cooling needs that are addressed with various technological solutions, some of which are reviewed herein. There is an ongoing need for improvements in electric vehicle technology and reduction in cost of electric vehicles. It is in this context that present embodiments arise.

SUMMARY

Various embodiments of an electric vehicle heating system, traction inverters, onboard chargers, driver circuits, and method of operation are described herein. Embodiments make use of a novel intermediate state, between fully-turned-off and fully-turned-on, for operating a switching device to intentionally produce high levels of Joule heating in order to eliminate costly resistive heating components.

One embodiment is an electric vehicle (EV) heating system. The EV heating system includes at least a driver circuit, and may also include a controller, a traction inverter, an onboard charger, and/or components defining a fluid path for heat exchange. The driver circuit is to operate a switching device at an intermediate state between fully-turned-off and fully-turned-on, in a heating mode to produce high levels of Joule heating for such intended purposes as heating a passenger compartment or the energy storage system of an electrically propelled, or braked, vehicle while eliminating separate resistive heating devices and their supporting components and systems to reduce cost and weight. The driver circuit is to operate the switching device to have a fully-turned-off state and a fully-turned-on state in a main function mode for a traction inverter or an onboard charger of the electric vehicle. The driver circuit is operable to cycle the heating mode and the main function mode for combining such heating and such main function operation of the traction inverter or the onboard charger.

One embodiment is an electric vehicle heating system. The EV heating system includes a traction inverter that has switching devices for operating an electric motor, and driver circuits each coupled to one or more of the switching devices. Each driver circuit is to operate the switching device, or a plurality of switching devices, at an intermediate state between fully-turned-off and fully-turned-on, in a heating mode to produce high levels of Joule heating for such purposes as heating a passenger compartment or an energy storage system. Each driver circuit is to operate the switching device or a plurality of switching devices, to have a fully-turned-off state and a fully-turned-on state in a main function mode for the traction inverter. Each driver circuit is to cycle the heating mode and the main function mode for combined such heating and such main function operation of the traction inverter.

One embodiment is a method of heating an electric vehicle. The method includes operating each of multiple switching devices of a traction inverter through a respective driver circuit, to operate an electric motor. The method includes operating at least one of the switching devices of the traction inverter through the driver circuit with the switching device at an intermediate state between fully-turned-off and fully-turned-on, in a heating mode to produce high levels of Joule heating. The method includes directing the Joule heating produced in the heating mode to heat at least a passenger compartment or an energy storage system.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 illustrates a Table having space vector modulation strengths in accordance with some embodiments.

DETAILED DESCRIPTION

Figure 1:
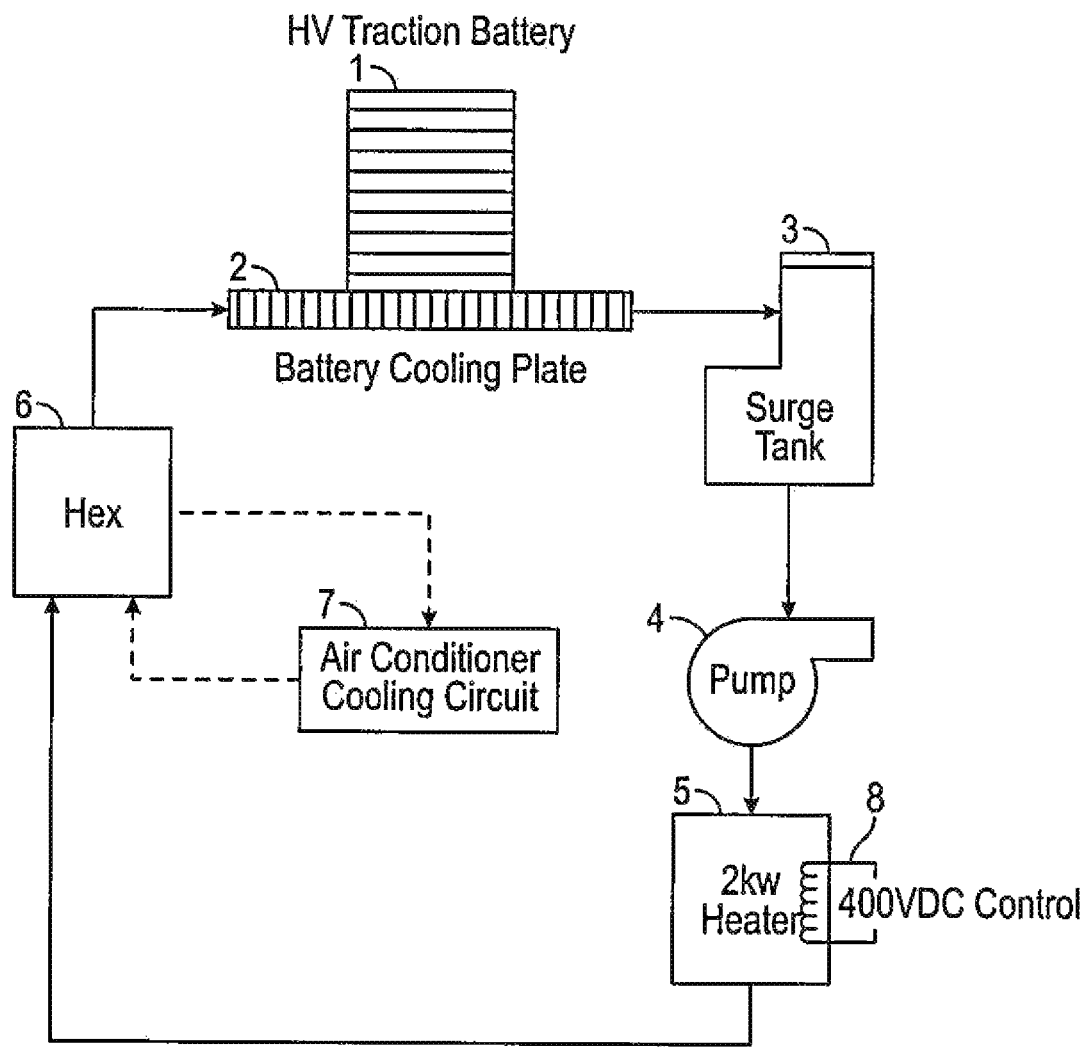
FIG. 1 depicts a hybrid/electric vehicle battery cooling system.

Described herein, in various embodiments, is a heating system for electric vehicles, which can be implemented as an ultra-low cost energy storage system preheater and/or heater and/or occupant heater. The embodiments create a novel electric vehicle traction inverter design that adds a third mode of operation to high power output stage switching devices. Present state of the art has two fundamental states for output stage switching of switching devices in high efficiency traction inverters, irrespective of the number of levels of voltage output produced by the inverter architecture—a high conductivity, low resistance, lowest power dissipation, fully-on switching state; and a zero conductivity, infinite resistance, zero power dissipation fully-off switching state. The present embodiments introduce a third switching state for a switching device, produced by a driver circuit that controls the switching device—a high power dissipation, semi-off, partially conductive, intermediate state (i.e., a state between fully-on state and fully-off state) which is selectively enabled in place of the zero power dissipation fully-off state, enabling switching device(s) to be used as a useful, controllable, heat energy source for such purposes that include vehicle cabin heating and energy storage system heating/preconditioning to replace or augment resistive heating devices and maximize overall vehicle efficiency by avoiding the dumping of heat from the traction inverter, or vehicle charger, overboard into the atmosphere and by eliminating the need to use, or reducing the amount of, power to utilize a heat pump device to move the heat from the traction inverter, or vehicle charger, to another location. This semi-off, intermediate state operates in one embodiment as MOSFET(s) gate(s) driven slightly above threshold voltage, a typically uncharacterized power device operating region, creating a partially conductive channel that restricts, but has non-zero, current flow with high voltage applied across drain and source of the MOSFET, producing controllable, and high levels, of Joule heating that heats a coolant intended to transfer heat away from the MOSFET. It should be appreciated that heat can also be moved using conduction or convection instead of by fluids or phase change cooling/heating in some embodiments.

The present embodiments eliminate costly dedicated resistor-based heating components, as found in electric vehicles for example, that are used as heat sources for thermal conditioning of vehicle components that include such components as traction energy storage systems, and as sources of heat energy for heating spaces and compartments, such as the vehicle cabin. While high power electronics are meticulously designed for maximum efficiency, and heat energy losses are considered detrimental, the present embodiment intentionally and selectively operates such devices in such modes so as to act as electrical resistors or current limiters/"throttles" to intentionally dissipate high levels of power in the switching device in order to provide a source of high thermal power that is then transported to heat exchangers by such means as conduction, convection, or by a liquid, phase change, or gas (including air) coolant to the device or environment in which the temperature is to be raised. Such high current devices associated with an electric vehicle include switching devices (e.g., semiconductor-based switches) that control traction motors, that perform DC-DC conversion, that perform AC to DC charging, and that drive high powered motors that include such devices as power steering pumps and air conditioning compressors and pumps. Such devices may be located on or in the vehicle or may be associated with an electric vehicle from time to time such as a vehicle charging station. As such, the sources of heat are not by necessity centralized and can produce heat for isolated coolant regimes, and may be transferred by such means as heat exchangers, or thermal media transfer, from one regime to another, as is currently practiced in the art for electric vehicle thermal conditioning. One aspect of the embodiment is that it allows continuous control of the amount of heat that is produced in one embodiment, whereas another method turns a high loss mode of operation on and off. It should be appreciated that these mechanisms facilitate control of the temperature of the system in which the devices are thermally incorporated and provide a mechanism to exploit, minimize, and eliminate, waste heat that would otherwise be dumped overboard into the environment due to excessive power level generation for a vehicle subsystem. The heat from the devices can be moved from the lossy switching device source by means of conduction, as would be exemplified by generating power in an air conditioning heat pump or compressor motor's semiconductor drivers in operation for transporting heat from one location to another, or drying air or defrosting a windshield, for example, by fluid (gas or liquid) transport, or by phase change or other suitable heat transfer/transport mechanisms. While high power devices, in the kilowatts regime of power control are identified, nothing prevents scavenging of heat from lower power switching devices operating in an embodiment that uses the third switching state, as well by such things as a heat pump or heat pipe, aggregating sources of heat. In one embodiment, the power devices are MOSFETS, which are typically run in a low resistance mode (high gate voltage, low ($R_{ds}$)—drain to source resistance, fully-on state) to produce minimal waste heat and in a very high resistance mode (low or even negative gate voltage, below threshold voltage, high drain to source resistance, fully-off state). Such power switching devices are herein run in the "triode" or linear resistor region, or with a low gate voltage and high drain to source voltage in the saturation region as partially conductive current limiters by pinching off part of the conduction channel to produce an effective current throttle in their conduction channels between the device source and drain terminals, creating a temperature rise because of the $I^2R$, or $V*I$, power losses to deliberately produce Joule heating, which is a product of the square of the current through the power device and the resistance of the aforementioned conduction channel or simply the power dissipated by limiting its current as a product of the applied voltage to it, $V*I$. Such modes of operation of a switching device in an intermediate state between fully-off and fully-on are novel in a traction inverter, and have been completely oblivious to designers that strive for maximum system efficiency through use of switching devices only in the fully-on and fully-off states as operation in this third regime would be deemed inefficient. Datasheets from manufacturers of the high-power switching devices do not characterize or specify this near-threshold-voltage region of device operation because it is simply not used by anyone practiced in the art. Generally, this paradigm of striving for efficiency in a traction inverter is viewed from within the designer's "siloed" system design, which focuses only on the traction inverter itself. When the overall vehicle is considered, however, heat in the embodiments discussed herein is reused for productive purposes like heating the passenger cabin or in heating the energy storage system for more efficient or higher energy delivery or acceptance. In that case, the heat intentionally generated by the instant embodiment is applied to productive means, making the "wall plug efficiency" of the mobility solution more efficient by utilizing the heat that would have been dumped out of a radiator as a waste product of the switching process by practitioners of the art taking pride in achieving "97% efficiency", for example, for their traction inverter subsystem which has its own dedicated cooling loop that dumps that 3% energy loss as heat overboard into the environment. These high power switching devices are generally liquid cooled to achieve million hour lifetimes, despite "the doors falling off the vehicle" after about 10,000 hours, i.e., projected life span of the power devices in an inverter is excessively longer than projected life span of many critical vehicle components and can be operated at elevated temperatures without harming vehicle lifetime, particularly in one of the embodiments as a Silicon Carbide switching device. As such, operating the switching devices at elevated temperatures in a third heating mode of switching does not affect overall vehicle life or reliability as long as temperature limitations are not exceeded.

Electric vehicles are used as a target application of one embodiment, though various embodiments could be used for other systems such as chemical processing plants, solar power systems, etc., varying somewhat in their schemes to thermally manage heat in the vehicle or other system. Some electric vehicles, for example the Chevrolet Bolt EV, partition their implementation into "islands" where each system is independent of the other, while the most recent incarnations of the Tesla Model 3/Y and Model S Plaid intermix everything and move the heat away from where it is undesirable to places is it needed though the use of a heat pump. The latter has proven itself not to be without flaws, with significant numbers of complaints from customers regarding an inability to heat the occupant cabin in extremely cold winter conditions, a well known limitation of heat pump systems where in household applications, electric heating strips are provided as backup heat sources in rooms. While heat pumps can improve vehicle efficacy through scavenging, to accommodate heating in winter conditions, the vehicle still requires a substantially sized supplemental heat source.

A review of the Chevrolet Bolt EV is presented first, then the present review progresses to the classical Tesla Model S cabin and battery heating system, to show representative implementations by practitioners of the art. Since the present embodiment concerns itself with heating, focus of these reviews will be on heating and not on cooling of the vehicle systems or using heat pumps to move heat from one environment or component/system to another. Again, these sources and scavenging methods are not exclusive to electric mobility devices.

Figure 2:
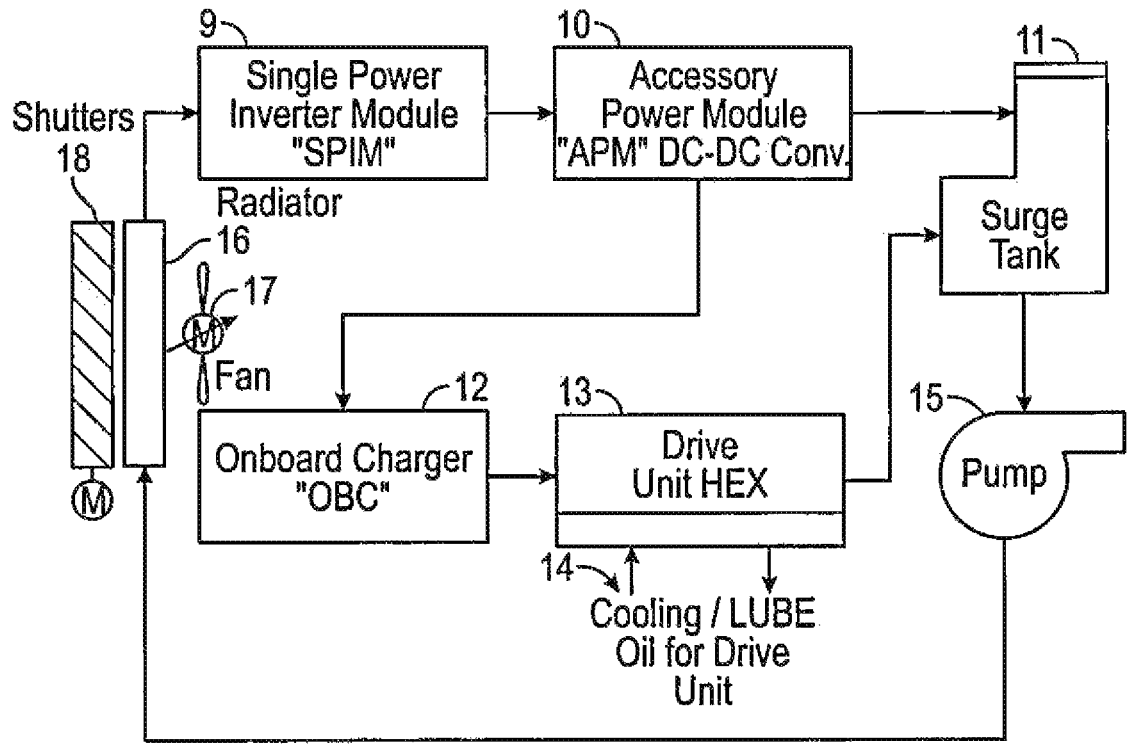
FIG. 2 depicts a hybrid/electric electronics system.
Figure 3:
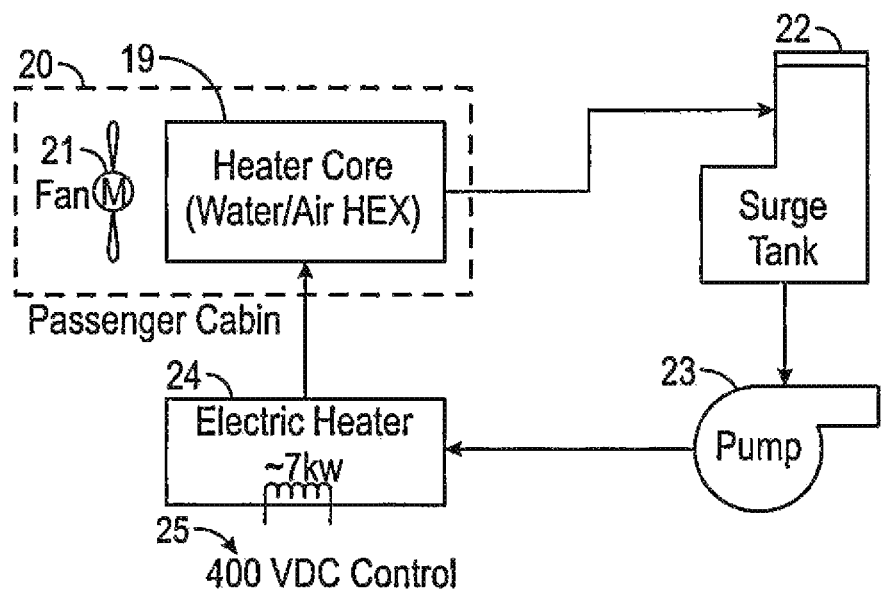
FIG. 3 depicts a hybrid/electric vehicle heater-coolant heater.

The Bolt EV has three independent thermal conditioning loops, somewhat misleadingly called "cooling" by Chevrolet when they are in fact, "thermal management." They are: 1) Hybrid/Electric Vehicle Battery 'Cooling' System (FIG. 1), 2) Hybrid/Electric Electronics 'Cooling' System (FIG. 2), and 3) Hybrid/Electric Vehicle Heater-coolant Heater (FIG. 3).

The Bolt EV heating/cooling loop, "Hybrid/Electric Vehicle Battery 'Cooling' System", shown in FIG. 1 is used to heat or cool the High Voltage Traction Battery 1. Thermal energy is transferred to or from the battery by means of a cooling plate 2. A coolant, typically ethylene glycol or propylene glycol, is used to move thermal energy in a loop, in this case the thermal energy from the battery cooling plate 2 to a reservoir, or "surge tank" 3. The surge tank then gravity feeds a variable speed pump (4) that pumps coolant in a steady flow around the loop at varying flow rates depending on the amount of energy to be moved. A general rule for lithium-based EV batteries is that they are preferentially kept at "comfortable human" temperatures, in the case of the Bolt EV, above 65 degrees Fahrenheit. If the battery temperature drops below this threshold, it becomes less efficient at delivering stored energy, and can be damaged if charged in excessively cold temperatures, so it needs to be heated in cold weather. The pump 4 circulates coolant through an electric heater 5, in the Bolt EV being powered from the ~400 VDC battery by a control circuit, and providing approximately 2 kW of thermal power to heat the coolant if the battery temperature is below its threshold of operation. As an aside, in some vehicles, not the Bolt EV, the battery is heated to higher temperatures prior to charging, on the order of 130° F.-140° F., to reduce the internal resistance of the battery to enable high "fast charging" rates—this process of preheating the battery before charging is called "preconditioning" in those vehicles. The heated or non-heated coolant then is routed to a heat exchanger ("HEX") 6 where the coolant can have its heat exchanged with the air conditioning refrigerant loop 7—in the Bolt EV this HEX is used for cooling the non-heated coolant only. From the HEX 6, the coolant is routed to the cooling plate 2 which transfers heat to/from the coolant, from/to the HV traction battery, by means of thermal conduction.

The Bolt EV cooling loop, "Hybrid/Electric Electronics 'Cooling' System", shown in FIG. 2, is used to cool the vehicle's high power electronics. The "single power inverter module", or SPIM 9, contains the high power drive electronics used to convert the ~400 VDC high voltage traction battery into a three phase alternating current of varying frequency, voltage, and current by methods known to those practiced in the art. The SPIM is designed to be maximally efficient, with much design effort to reduce the amount of waste heat produced in the process of "inverting" DC to AC for the traction motor. This loop only has provisions for cooling its components to ambient temperature via radiator 16. In the Bolt EV, the traction motor is on the order of 150 kW in power, and one can assume that the inverter normally operates with efficiency greater than 95%. At maximum power output, this means the inverter must dissipate up to 7.5 kW of heat, the equivalent of about a half dozen home space heaters. Fortunately, normal operation of the vehicle does not occur at maximum power levels for extended periods and actual "normal" driving uses about 18 kW to 30 kW of traction power from the motor, meaning about 900 W to 1.5 kW is to be dissipated as heat by the SPIM. The liquid coolant is then routed from the SPIM 9, to the "Accessory Power Module" 10, or APM, which DC-DC converts the ~400 VDC HV traction battery voltage to ~12 VDC to be used by 12V vehicle accessories and electronics and is used to charge an onboard 12V battery to provide power to the vehicle electronics and accessories while the HV battery is either disconnected or not in use. The APM replaces the alternator as found in an internal combustion vehicle, and delivers on the order of 100 Amps of current at a nominal 12V or about 1200 W. Assuming 90% efficiency, this means at maximum power delivery, the APM will need to dissipate approximately 120 W of power into the coolant. The higher power SPIM 9, precedes the APM 10. The coolant then splits to two paths with a simply Y-connected pair of hoses, with one path being a return to the top of the reservoir, or "Surge Tank" 11. The other half of the coolant flow split goes to the onboard charger, OBC 12, which only operates when the vehicle is charging. The Bolt EV is capable of charging at 12 amps at 240 VAC, which is about 3 kW. Assuming 90% efficiency, this means about 300 W of power needs to be dissipated into the coolant. The coolant then routes to a heat exchanger on the drive unit, HEX 13 to indirectly cool the oil used in the drive unit to lubricate moving parts and to extract heat from the motor components 14. The coolant then returns to the surge tank 11. From the surge tank, the coolant is gravity fed to a variable speed motorized pump which imparts flow to the coolant to push it to the radiator 16, which is a liquid to air heat exchanger. The radiator's cooling efficacy is assisted by the vehicle airstream when motorized shutters are opened, as well as a variable speed fan 17. The cooled coolant then is routed to the SPIM 11 to complete the loop.

The Bolt EV heating loop, "Hybrid/Electric Vehicle Heater-coolant Heater", shown in FIG. 3 is used to heat the passenger cabin by heating coolant, then using a heater core to exchange that coolant heat with the cabin air. The coolant reservoir, or "Surge Tank" 22, is used to hold a reserve of coolant. From the reservoir, coolant is gravity fed to a variable speed motorized pump 23, which then causes coolant to flow to an electric heater 24. This electric immersion heater 24 heats a resistive material using the HV traction battery's 400 VDC power, with on the order of a maximum of 7 kW of power, as delivered by the power and control circuits 25. Nominally, this heater has been observed to use approximately 2 kW to 3 kW in normal operation and the objective of the heater is to heat the coolant to a nominal 130 degrees Fahrenheit. The heated coolant is then routed from the electric coolant heater 24 to a water to air heat exchanger 19, also known in the industry as a "heater core", housed in the passenger cabin 20. The heat transfer to the cabin air is maximized as needed by a variable speed motorized fan 21.

Figure 4:
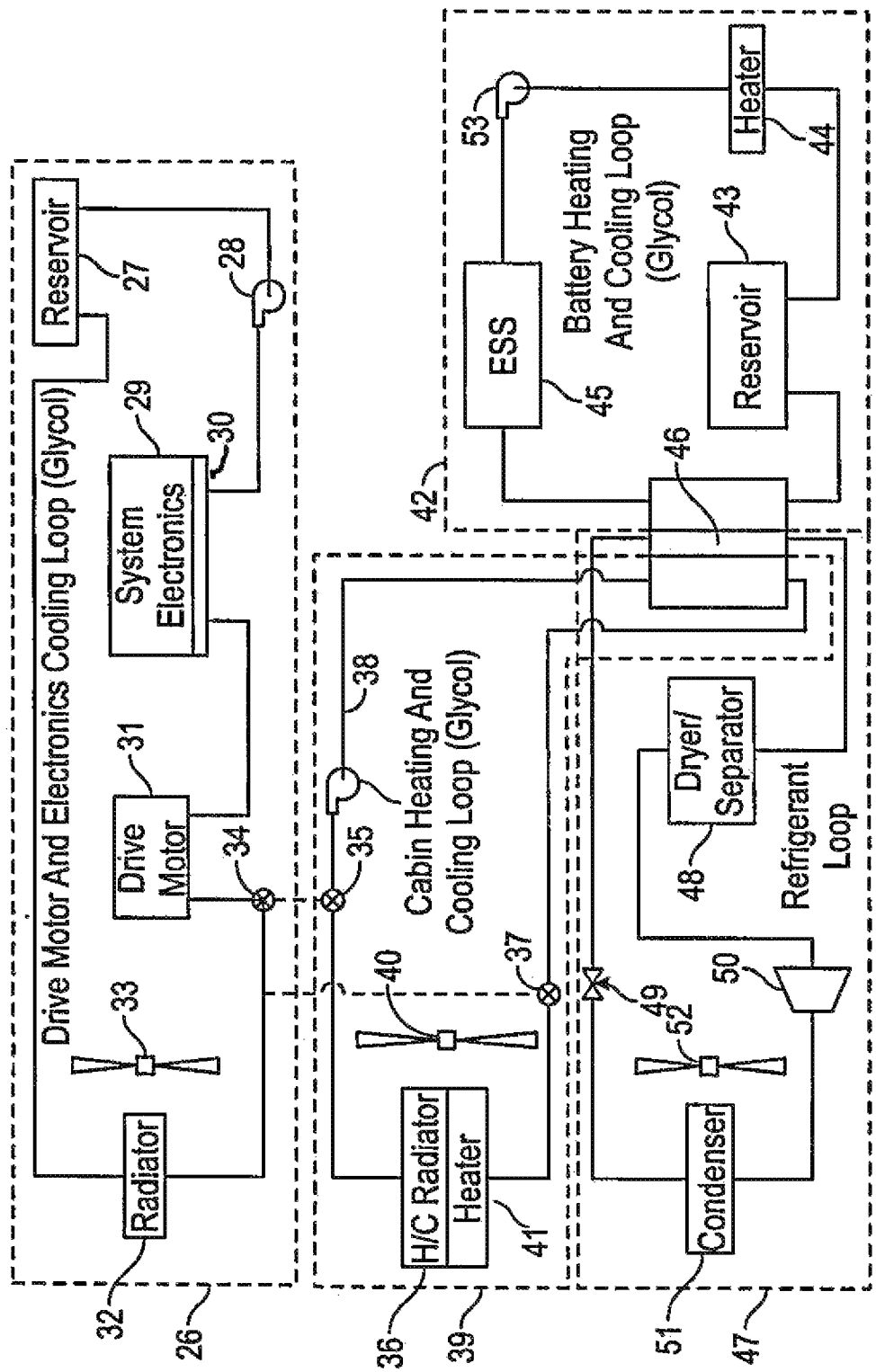
FIG. 4 depicts heating loops in an electric vehicle.

The Tesla Model S bears similarities to Bolt EV's loops. The Tesla's heating loops are shown in FIG. 4. As in the Bolt EV FIGS. 1, 2 and 3, respectively, the Tesla divides cooling loops into three similar domains, each with a dedicated coolant pump, with similar affected components, namely battery heating/cooling 42, vehicle electronics cooling 26, and cabin heating and cooling 39. The Tesla, however, enables crossing over between coolant domains, where heated coolant from the vehicle electronics can be used to heat the cabin, facilitated by valves 34, 35, 37 and can even use that heat to warm the battery via the heat exchanger HEX 46. An air conditioning system can be used to cool the battery via HEX 46. Notably an electric immersion heater 44 is used to warm coolant to heat the battery 45 and another electric heater 41 is used to warm the cabin air. In normal driving conditions, there simply is not enough heat generated in the inverter 30 or the drive motor 31 to heat the cabin or to preheat a stationary car's battery in preparation for charging. Newer generation Tesla vehicles use a heat pump to scavenge heat where possible, but in extremely cold weather, there isn't enough heat being generated in the vehicle, or is present in cold ambient air, to scavenge. The components in the vehicle were designed to minimize heat lost in their operation, which necessitates the inclusion of expensive heating element-equipped components in electric vehicles, as can be seen in FIG. 4 for cabin heating with significant additional cost for battery heating modules and controllers. These electric heaters are also generally necessitated in heat pump equipped vehicles operating in extremely cold weather conditions.

The embodiments described herein provide for a mechanism to reduce cost and complexity of the overall system and recognize that electrically produced heat is drawn from the energy storage system (in an EV, an HV (high voltage) battery, for example) irrespective of the element that generates that heat. Any "non-useful" heat dumped overboard via the radiator to the atmosphere is energy lost from the energy storage system that did not perform useful work or warming. Practitioners in the art are conditioned to maximize efficiency and reduce the heat produced by functional elements such as motor drive inverters and vehicle chargers, for example, and to throw that "minimized" heat away. To create the heat needed by vehicle cabin occupants in cold weather, to heat the energy storage system to operate at its maximum efficacy in cold weather, and to enable the energy storage system to be replenished or depleted at very high rates of charge or discharge, vehicle designers and architects add resistor-based electric heating devices in coolant loops associated with vehicle cabins and energy storage systems. The embodiments described herein dispose of these expensive resistor-based heating devices completely as needless devices, and intentionally repurpose and reuse existing components in the traction inverter described herein to deliberately generate Joule heating, in one traction inverter embodiment discussed here, in the vehicle charger in another embodiment, and in other embodiments can be applied to moderate to high power electronics driving such high loads of power steering, and air conditioning, pumps where heat is being scavenged by the likes of a heat pump or heat pipe.

In one embodiment MOSFET devices drive high power traction motor loads, such as is found in vehicle traction inverters. Other types of switching devices, including BJT (bipolar junction transistor), Insulated Gate Bipolar Transistors ("IGBT"), cascode amplifier and stacked transistor high voltage topologies, other types of FET, fluidic switching devices, MEMS devices, etc. are applicable to further embodiments. One attribute of a MOSFET is its ability to very quickly create a low resistance ($R_{ds}$) conductive channel between its source and drain terminals, or to very quickly "pinch off" that conductive channel completely to create an open circuit (ignoring tiny amounts of current leakage) allowing the device to act as a low loss switch. The switching on and off of very high currents on very high voltage power supplies by MOSFETs 58-63 (FIG. 5) is controlled by a "gate driver" 64-69 which controls a "gate" electrode by having a positive voltage applied to the gate electrode, $V_{gs}$, close in magnitude to its maximum allowable voltage to switch it on, or having the gate electrode at approximately the same potential, with respect to the source electrode to turn it off, respectively in the case of an N-channel device in one embodiment. For an inverter, turning the device on "hard", with a control, e.g., voltage gate to source of around 15-20V in one embodiment, results in creating a minimal $R_{ds}$ conductive channel, which means the square of current through the device multiplied by that $R_{ds}$ results in minimal power loss and device heating. Switching the device very quickly minimizes the time the devices spend in transition between full on and fully off states, reducing power dissipation and device heating while in the transition region of operation. For a typical Silicon Carbide MOSFET, a 400 amp device will have an $R_{ds}$ of around 6 milliohms when the MOSFET is fully-on, resulting in a power dissipation of around 960 W. 400 amps at a HV battery voltage of 400 VDC translates to the ability to drive a motor with 160 kW of power while losing only 960 W when the switching device is turned fully-on, resulting in a switching efficiency of 99.4% for the MOSFET. An EV, though, only uses about 30 kW-60 kW in normal driving, so the thermal losses are on the order of only 34 W-70 W in the switching device discussed in the example embodiment because losses are related to the square of current.

Figure 5:
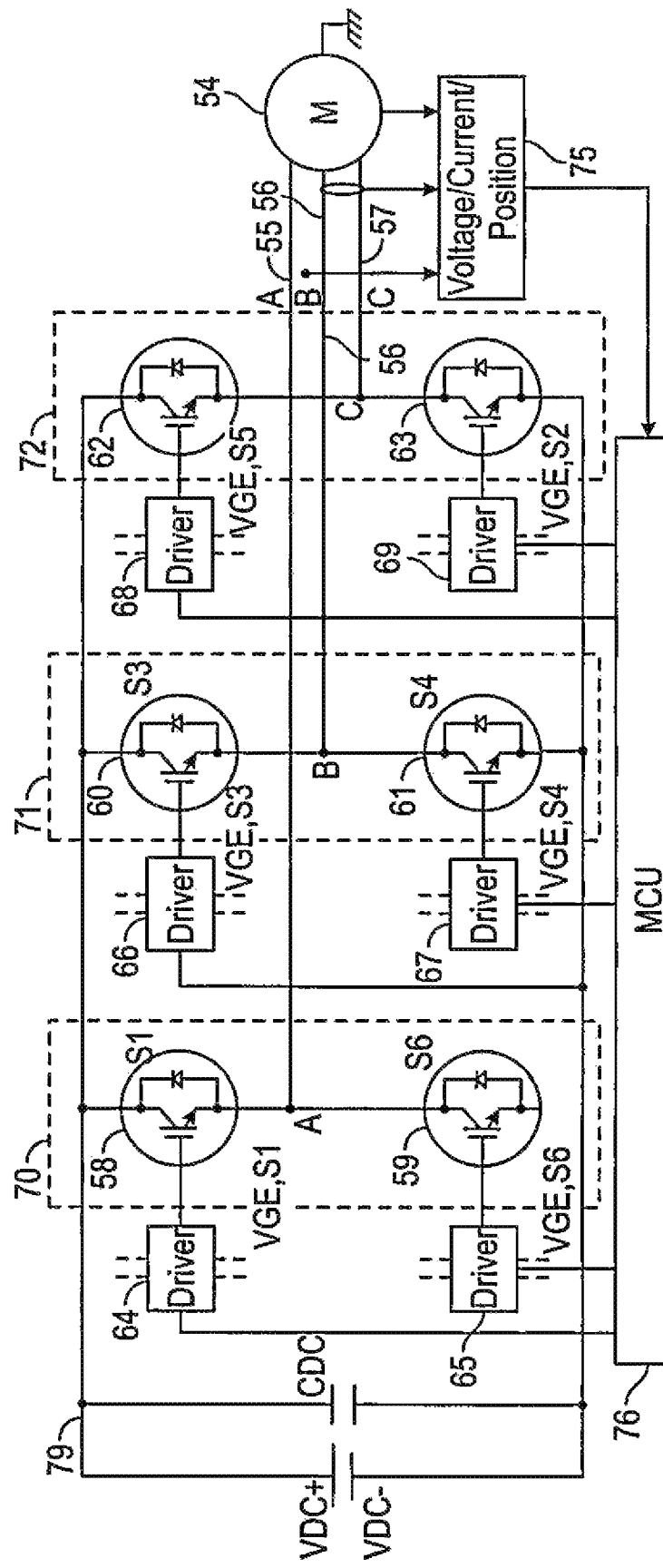
FIG. 5 depicts an example three-phase traction inverter for an electric motor of an electric vehicle in accordance with some embodiments.

To drive a brushless motor 54, in FIG. 5, whether permanent magnet or induction, a varying electric field needs to be created in three phases, typically, though other embodiments may have more or fewer phases. This magnetic field in the motor is created by varying the current in the motor's three windings 55, 56, 57, as three distinct current waveforms that vary with time, ideally as sinusoids, and with a frequency more or less proportional to the motor rotational speed. The arrangement of switching devices, MOSFETS in the embodiment, is presented in FIG. 5, MOSFETs 58-63. Though the states of the switching devices for a 2-level inverter are presented as vectors in the table 73 of FIG. 6, it is notable that there are only 6 active states per cycle 74, where each of the switching transistors is fully on or fully off for a total of half the cycle. Fully on, by methods used by those practicing the art, means minimal heat loss, maximum conduction, low $R_{ds}$ by means of fully driving the MOSFET gate with, typically, 15V to 20V. Fully off, again means zero current, which means 0V on the gate, but because of device characteristics and leakage, SiC MOSFETS', as in one embodiment, gate voltages are generally driven below the potential of the MOSFET source terminal to negative voltages, such as −5V to fully turn the device off.

In the currently discussed embodiment of FIG. 5, each of the MOSFETs 58-63 has a driver circuit 64-69, associated with its gate electrode. Upon receiving a high or low signal from a control circuit, such as an MCU, 76, the driver circuit is designed to isolate the MCU's 3-5V signal from the high voltages (close to the HV battery 79 voltage, such as 400 VDC) at which the "high side" MOSFETS 58, 60, 62 operate on their gate (despite −5V<$V_{gs}$<20V), and drive the high capacitance gate with sufficient strength to quickly switch the MOSFET fully on or fully off. Switching as quickly as possible is practiced by those versed in the art to minimize the power dissipated in the region between a fully on and fully off operational state.

Figure 8:
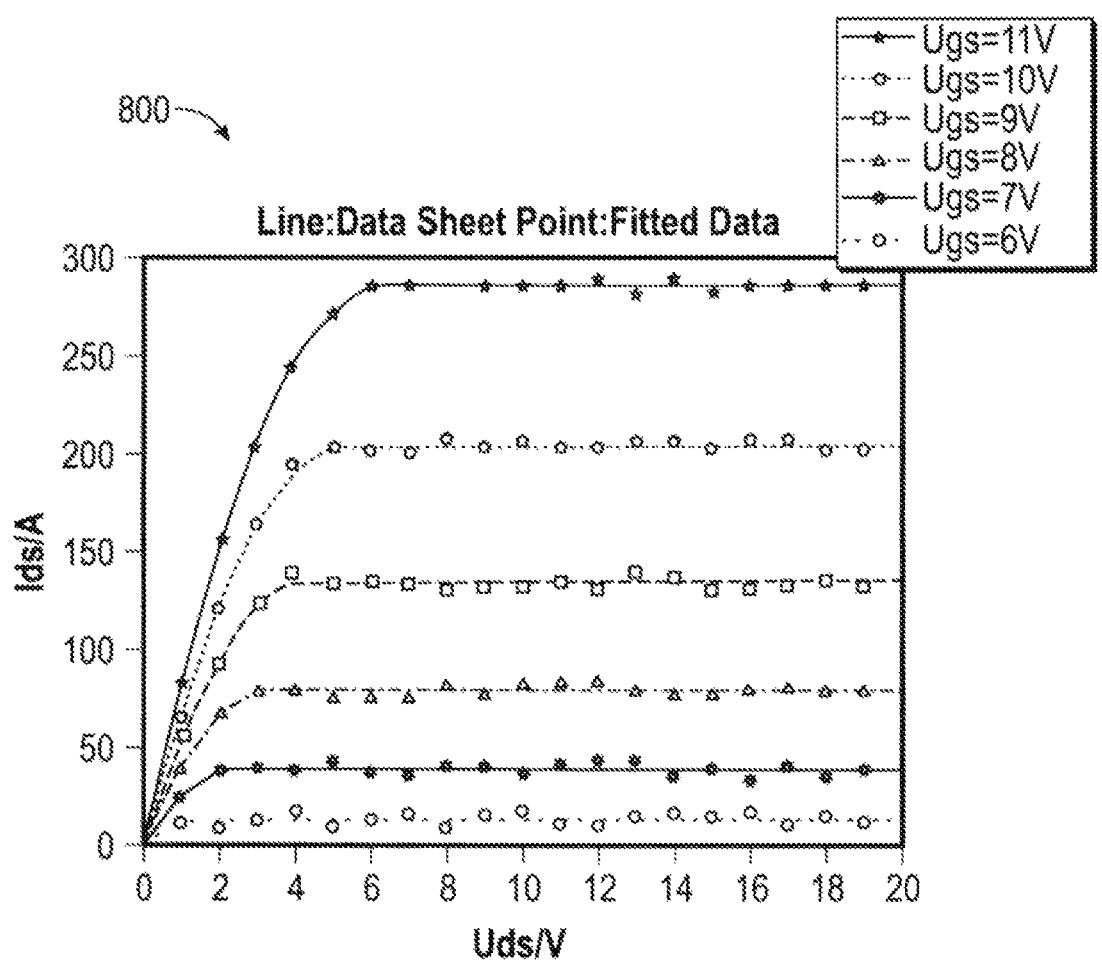
FIG. 8 depicts example MOSFET characteristic curves in accordance with some embodiments.

The embodiments add a novel element to a driver circuit by adding a third state of drive and operation to the MOSFET gate(s), which is according to a HEAT-signal in one embodiment. In one embodiment, the presence of an active low HEAT—signal, devices designated as OFF in table 73, are, instead, partly turned on to where they conduct a few amps of current. This is because the MOSFET channel is partially pinched off by low $V_{gs}$ voltages of a few volts, just slightly above the threshold turn-on voltage, "Vth"; in one embodiment +5V is used as an example, where Vth is assumed to be around 2.5V typically. This voltage will vary by device type, from device to device and even among devices from within the same manufacturing lot, and could be temperature compensated in one embodiment or self-characterized in another embodiment to adjust for such device variations. In one embodiment, the operating mode of the switch device operates in a regime outside that encountered in normal power MOSFET operational ranges for switching applications and it may be difficult to find characteristic device curves from device manufacturers, such as Ids vs. Vas for $V_{gs}$ less than 10V—it's preposterous to intentionally burn power according to the thinking of many practicing the art of designing circuits utilizing switching devices and for the switching device product definers and applications engineers to contemplate such regions of intentional operation would reveal incompetence. FIG. 8 illustrates exemplary modelling of power devices though they are not characterizations from manufacturers and merely were rigorous validations of models against real semiconductor operation by the modelers.

In the embodiment where MOSFET characteristic curves 800 of FIG. 8 provide a verification of the model against real device behavior, one thing that seems fairly consistent is that power dissipation is readily modulated over at least a 30:1 range using $V_{gs}$ in the 6V to 11V area for one example MOSFET, and related control voltages and power dissipation are readily understood for further MOSFETs and further types of switching devices. In one embodiment, a sense resistor or current transducer may be used between the source of the MOSFET and its lower connection (such as HV Battery negative for low side devices, or motor phase winding for high side devices) to provide feedback to finely control the amount of current flowing in the partially off MOSFET. In another embodiment, the MOSFET is in a current mirror with a smaller device made in the same process. Further types of current sensors, such as Hall Effect, induction, voltage measurement across parasitic resistance, sensing coils, etc., are readily applied to further embodiments. In an alternate embodiment, the objective is recognized to not be a current level, but heating coolant to an objective temperature without exceeding maximum switching device temperature ratings, so a temperature sensor in one embodiment, and a plurality of temperature sensors in another embodiment, are used to raise or lower the power dissipated in the switching device while in its third state of operation. In a further embodiment, a maximum temperature setpoint is sensed resulting in switching the device from its partially on state to its fully off state, despite a command to enter the heating mode, until a lower, hysteresis temperature is obtained in order to protect the switching device.

In one embodiment, a theoretical SiC MOSFET device has a saturated Ids drain current of 4 amps at a $V_{gs}$ of +5V. This means, when the mate device in its phase leg, i.e., one of phase legs 70, 71, or 72 of FIG. 5, is fully on, the HV battery's, 75, voltage (in one embodiment, 400 VDC) is applied to the device, resulting in a power dissipation of 400*4=1.6 kW. This power is dissipated into the MOSFET's cooling mechanism which heats a coolant in a loop. That coolant then transports the heat to where it will be useful, such as heating an occupant cabin, warming an energy storage device, which includes storing the heat energy itself, heating seats, or acting as a source of energy for some thermal device.

If the motor, 54 is not running, fully turning on the high side MOSFETS 58, 60, 62 (e.g., in the driver in FIG. 5 modified to use MOSFETs in place of IGBTs 58, 59, 60, 61, 62, 63) means no potential difference (voltage) is present across the motor windings 55, 56, 57, and therefore no current flows in the motor. However, if the HEAT—signal is applied, the low side MOSFETs 59, 61, 63 partially turn on, each dissipates 1.6 kW of heat, resulting in 4.8 kW of heat for the occupant cabin, for example. The third state facilitates heating to occur in the switching device despite the switched load having no current flowing in it, i.e., the load is "off". These low side devices can be modulated by PWM one embodiment, providing a full range of thermal power from almost zero to 4.8 kW, or can simply be turned on and off using "bang bang" control methods in another embodiment. In one embodiment, the vehicle is coasting or stopped, using its inertia to keep moving or remain motionless, while the motor has no current (the motor is not producing torque) flowing in it while the low side devices are producing heat from the energy storage device.

The MOSFETS can also alternate their motor off duties to generate intentional heat by partially turning on both the high side and low side MOSFETS to split the power dissipation between both devices, halving it in one embodiment, or in another embodiment by fully turning on the low side MOSFETS 59, 61, 63 and partly turning on the high side MOSFETs 58, 60, 62 (i.e., in the intermediate state), or in an alternate embodiment, PWM modulating those high side MOSFETs 58, 60, 62 with the low side turned on. With the motor running, not fully turning OFF the devices when the HEAT—signal is active, causes them to act as Joule heating sources while the motor current is largely unaffected. In this manner, various embodiments for an electric vehicle heating system can produce combined heating, through operation of one or more of the switching devices in the intermediate state, and main function operation of a traction inverter, through operation of switching devices in the fully-on and fully-off state, cycling the heating mode and a main function mode through each of various driver circuits. For example, an embodiment could modify Table 1 of FIG. 6, keeping the "ON" (i.e., fully-on) states, replacing one or more of the "OFF" (i.e., fully-off) states with the intermediate state described herein, for the heating mode of operation of the respective switching device while the inverter is operated in a main function mode to drive an electric motor. In another embodiment, the fully on state of the motor state table is PWM modulated to limit motor current and the off portion of that PWM cycle enters the intermediate state described herein during the "off" portion of the PWM cycle. In various embodiments, one or more, or each of the switching devices is operated in each of the fully-on, fully-off and intermediate states, by a respective driver circuit.

By this means, expensive resistor-based heating devices, such as electrical PTC (Positive Temperature Coefficient resistor) air heaters, electrical PTC immersion coolant heaters and heat pumps in the embodiment where an inexpensive vehicle has no air conditioning, can be completely eliminated for the purposes of warming occupants in the vehicle cabin, or the energy storage system, substantially decreasing the cost of such electric vehicles that are produced in high volumes and making electric vehicles more accessible to lower income households.

Figure 7:
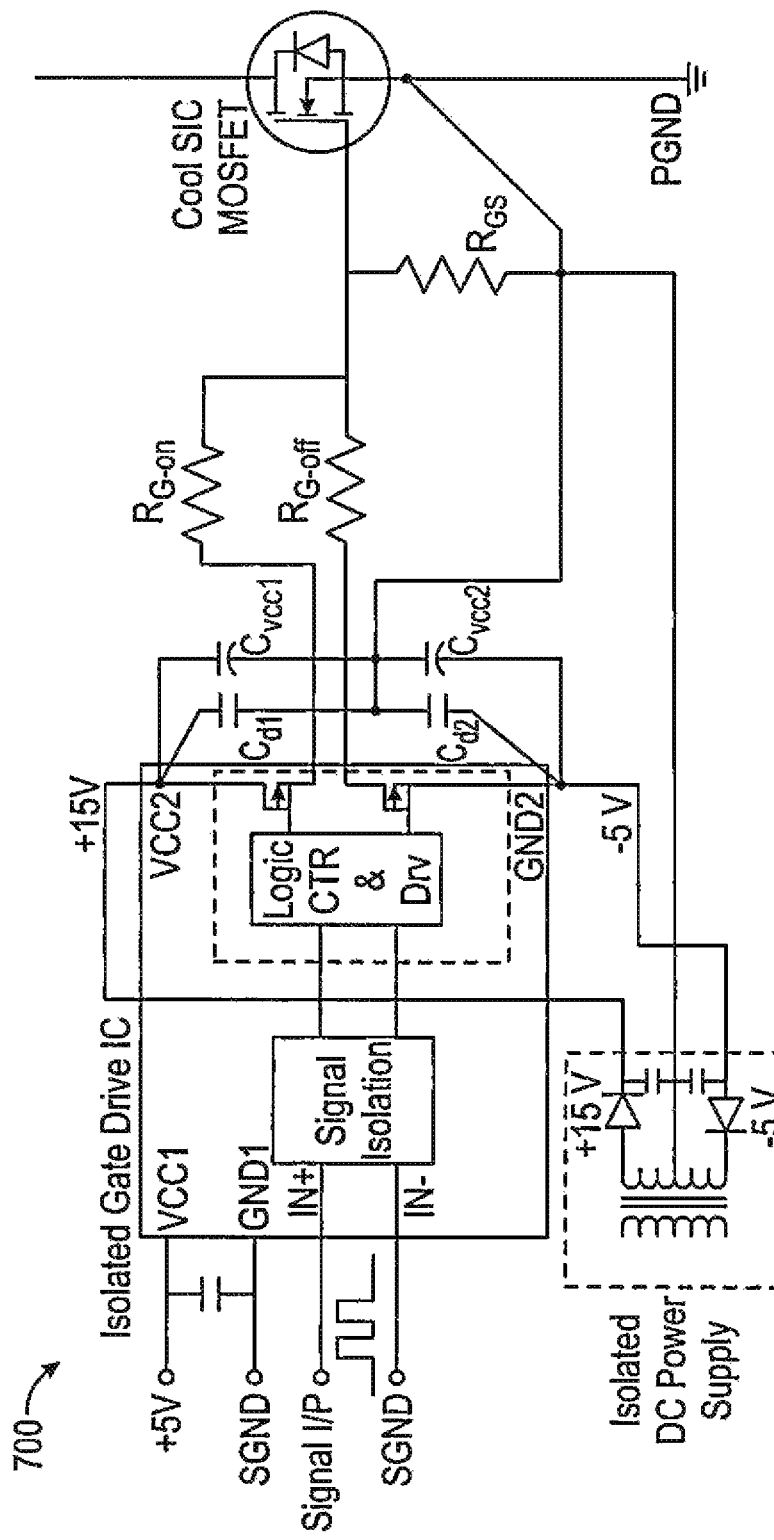
FIG. 7 depicts an example isolated MOSFET drive circuit in accordance with some embodiments.
Figure 9:
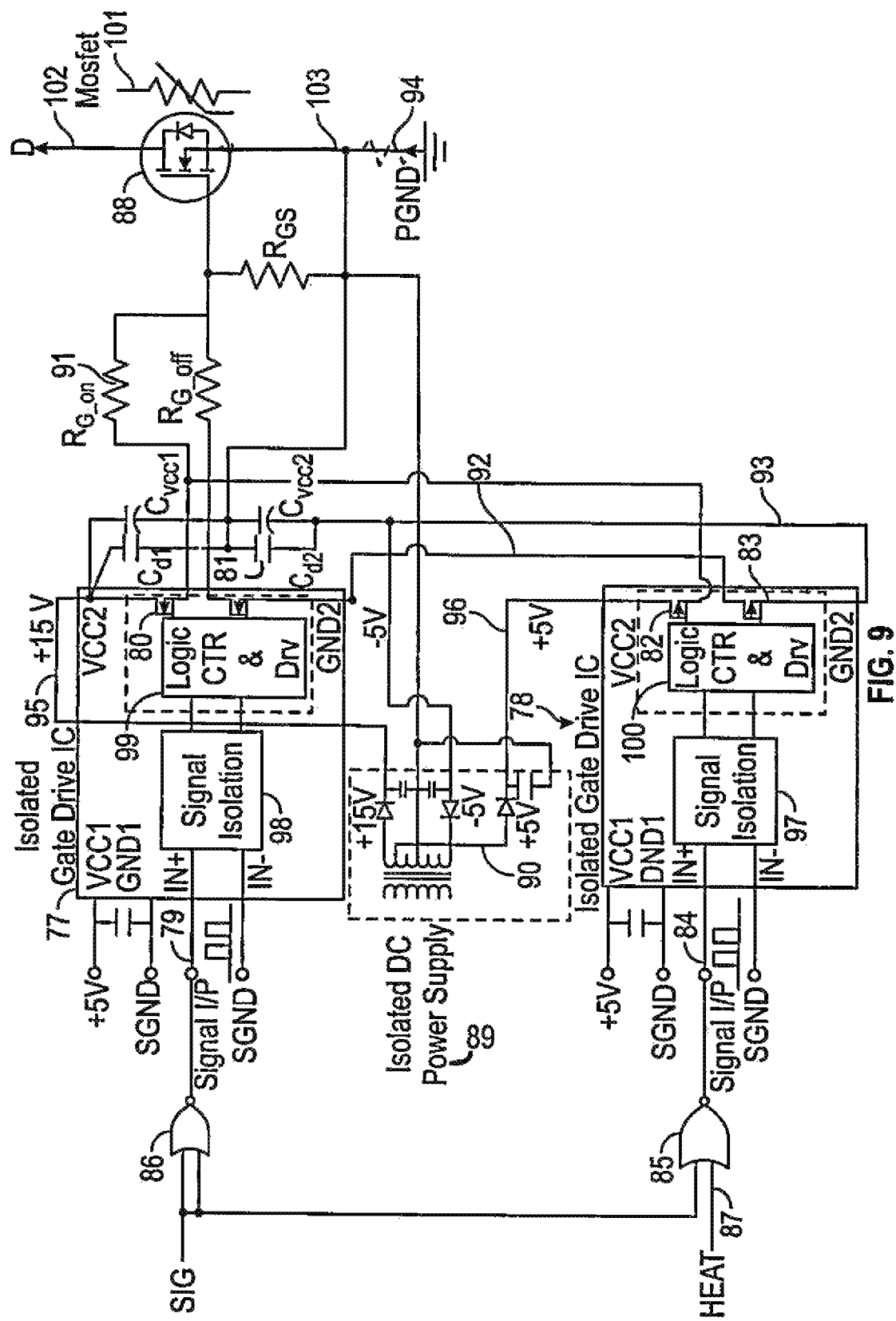
FIG. 9 depicts an embodiment of a drive circuit for an electric vehicle heating system in accordance with some embodiments.

One embodiment, shown in FIG. 9, uses the drive circuit 700 of FIG. 7 as the basis for implementation. A theoretical device in this embodiment, as previously described herein, has characteristics of saturating at a channel current of 4 amps at a $V_{gs}$ of +5V. The driver circuit in FIG. 9 may be implemented in a number of ways, and further driver circuits with related functionality readily devised, by those versed in the art and the embodiment in FIG. 9 is by no means the only way to implement the embodiments, where it is desired to either use a device, or a plurality of devices, as a heat source, or as a low loss switching device, based on a commanded state. In one embodiment, the HEAT—signal is used where the switching device is used as a heat source when HEAT— is active, low, and as a high efficiency switch with low losses when HEAT-is deactivated, high. As in FIG. 7, one embodiment of gate driver IC 77 is more or less identical, except that the source of device 81 is disconnected from the devices in FIG. 9 and is instead connected to the drain of device 83 in driver IC 78. Device 83's source terminal is then connected the way device 81 was connected in drive circuit 700 of FIG. 7.

In operation, when HEAT—is inactive, high, at 87, when high efficiency and no heating are desired, device 83 turns on and enables a path to −5V for any devices connected to its drain terminal. This effectively creates the same connections as in drive circuit 700 of FIG. 7 for device 81. Device 78 otherwise ignores the SIG signal which is meant to turn MOSFET 88 on and off. As such, a high on SIG will turn on device 80, connecting the gate of MOSFET 88 through the $R_{g\_on}$ gate resistor to +15V provided to IC 77 by isolated power supply 89. In another embodiment, this voltage may be generated by use of a charge pump circuit. Device 81 is turned off so the gate of MOSFET 88 charges quickly up to +15V with respect to its source 103 which is the 0V reference of the isolated power supply 89. A low on SIG will turn off device 80 and turn on device 81, connecting the gate of MOSFET 88 to −5V through $R_{g\_off}$ device 81, and the already on, by HEAT—being high, device 83. This fully turns off MOSFET 88 by connecting its gate terminal to −5V. The MOSFET therefore behaves identically to the MOSFET in drive circuit 700 of FIG. 7 in response to SIG and when HEAT—is inactive (high). In passing, note that the "PGND" designator of FIG. 9 and the ground symbol merely designate the negative-most terminal of the circuit block as it would appear, for example, as either the high side or the low side switching device in a two level inverter architecture, or as for any switching device in a switching architecture.

When HEAT—is low, the embodiments cause the MOSFET 88 act as a lossy device when off as the result of SIG being low, yet still the MOSFET turns on fully when SIG is high. When SIG is high, IC 77 functions as previously described by driving the gate of MOSFET 88 with +15V turning it fully on. Device 81 is off so the gate of MOSFET 88 cannot be connected to −5V. When SIG goes low, signaling an OFF state for MOSFET 88, HEAT—modifies that state to be interpreted as "slightly on". Device 80 turns off, disconnecting +15V from MOSFET 88's gate. Device 81, however, is turned on, connecting the gate of MOSFET 88 to the drain of device 83. Because SIG's low signal is effectively inverted by NOR gate 85, device 83 is turned off, preventing the connection from the gate of MOSFET 88 from being completed to −5V through device 81. SIG being low, and being effectively inverted by NOR gate 85 will turn on device 82, connecting the gate of MOSFET 88 through $R_{g\_on}$ to +5V. Recall in the embodiment that when MOSFET 88's gate is at 5V, it sets up a saturated channel at 4 amps, no matter what voltage is applied across the MOSFET's source and drain terminals, MOSFET 88 is not fully turned off, as MOSFET 88 was when −5V was applied as a control voltage to its gate as practitioners in the art would do to operate MOSFET 88 in the fully-turned-off state to achieve "high efficiency" in the inverter itself, but rather MOSFET 88 is partly turned on. In one embodiment, the voltage applied at intermediate state voltage supply 96 by supply 89 is variable, in another embodiment, the current through MOSFET 88's drain to source path is monitored (e.g., with a current sensor 94) and the power supply applied to intermediate state voltage supply 96 is adjusted to a regulated current value to achieve maximum safe power dissipation in MOSFET 88 to effect heating of its cooling loop. In these embodiments, and variations thereof, the control voltage for the MOSFET 88, e.g., voltage at the gate, is supplied as intermediate state voltage supply 96 and is adjusted based on sensing current of the MOSFET 88. Alternatively, such adjustment could be made based on sensing temperature of the MOSFET 88, for example with a temperature sensor or other sensor. The OR gate 86 is present to match propagation delays with NOR gate 85 in one embodiment. In a single isolated gate driver embodiment, the OR and NOR functions would be absorbed in a combined logic and control block 99, 100. Any requirement to synchronize the changing of states of HEAT—with respect to SIG is easily implemented if needed by those versed in the art. A consolidated driver device, or a plurality thereof, combining the functions of 77 and 78, would have HEAT- and SIG inputs which are isolated (functionally 97, 98) before going into the logic and control blocks. Device 83 is not necessary in a consolidated driver device and can be eliminated if the logic and control block implements its effective logical AND function. Device 82 would coexist in the same isolated gate driver IC as device 80, with one connected to the full drive supply, typically 15V to 20V, and one connected to a circuit that produces a control signal that creates a current limiting channel in MOSFET 88. Note that the partial on-state of MOSFET 88 can be achieved by connecting to a plurality of isolated voltages, providing quantized steps in heat generation, or it can be continuously variable under either open or closed loop control such as proportionality to the drain to source current, device temperature, or coolant temperature, and can be limited, or controlled, by device temperature in some embodiments. Some inverters, like the one in the original Model S, use a plurality of transistors as switching devices in each phase leg, so another embodiment would simply switch one, or several, device(s) partially on instead of all of them if the $R_{ds}$ of an individual device when fully turned on is high enough or if the channel current is sufficiently throttled within the power limitations of the device(s). In another embodiment, a smaller, high $R_{ds}$ device, or plurality thereof, is incorporated as part of the high power output transistor array, providing an inexpensive means to move thermal energy into the coolant while adding current switching capacity. In an alternate embodiment, a different $R_{g\_on}$ and $R_{g\_off}$ resistor can be switched in, increasing the device transition time through the high power dissipation region, increasing its power during switching of the device to intentionally generate heating in the switching device as a commanded switching state.

If the MOSFET 88 in FIG. 9 was connected to a 400 VDC power source by another switching device on the opposite of the high or low side of the phase leg 70, 71 or 72, (e.g., driver in FIG. 6 modified for MOSFETs in place of IGBTs 58, 59, 60, 61, 62, 63) to which MOSFET 88 is connected, with the embodiment's MOSFET characteristics, the +5V applied to the MOSFET 88 gate would enable 4 amps of current to flow in the device and with a 400V applied across the device, it would dissipate 1600 W into its cooling means. It should be appreciated that the cooling system is capable of transferring this maximum power by such means as coolant flow rate, pump speed, heat transfer surface area, materials selection, or by dividing and conquering the problem into multiple switching devices. In one embodiment, multiple higher $R_{ds}$ devices are each used for the low loss switching function and one or only a few devices are selectively turned on to force them to dissipate more power. By pulling HEAT-high, inactive, MOSFET 88 acts as the high efficiency, relatively low power dissipation, switching device. With 6 devices in the three phase, two level, inverter configuration and with the motor in an off state, in one embodiment three of the MOSFETs would be partially on, acting collectively as a 3*1600 W=4800 W heat source to produce four residential space heaters' worth of peak, high rate passenger cabin heating, during the time the MOSFETs are in the heating state. PWM control of HEAT—in one embodiment, and a variable or quantized isolated power supply voltage 90 in another embodiment, results in lowering of power dissipation as passenger cabin heating requirements level off to one or two kilowatts for a warmed cabin. The embodiments can be implemented for an approximate added cost of $20, while also eliminating between $500 and $1000 worth of an EV's resistor-based heater modules, which include heating elements, packaging, high power driver electronics, control electronics, hoses and pipes, with typically one set of those heater modules for occupant coolant heating and another set for energy storage system heating. In various embodiments, the amount of power dissipated, and corresponding heating produced in heat mode of operation of a switching device is either designed for or controlled to not exceed a power rating of the switching device, so that expected switch lifetime (and inverter lifetime) is preserved to levels appropriate to expected vehicle lifetime.

Figure 10:
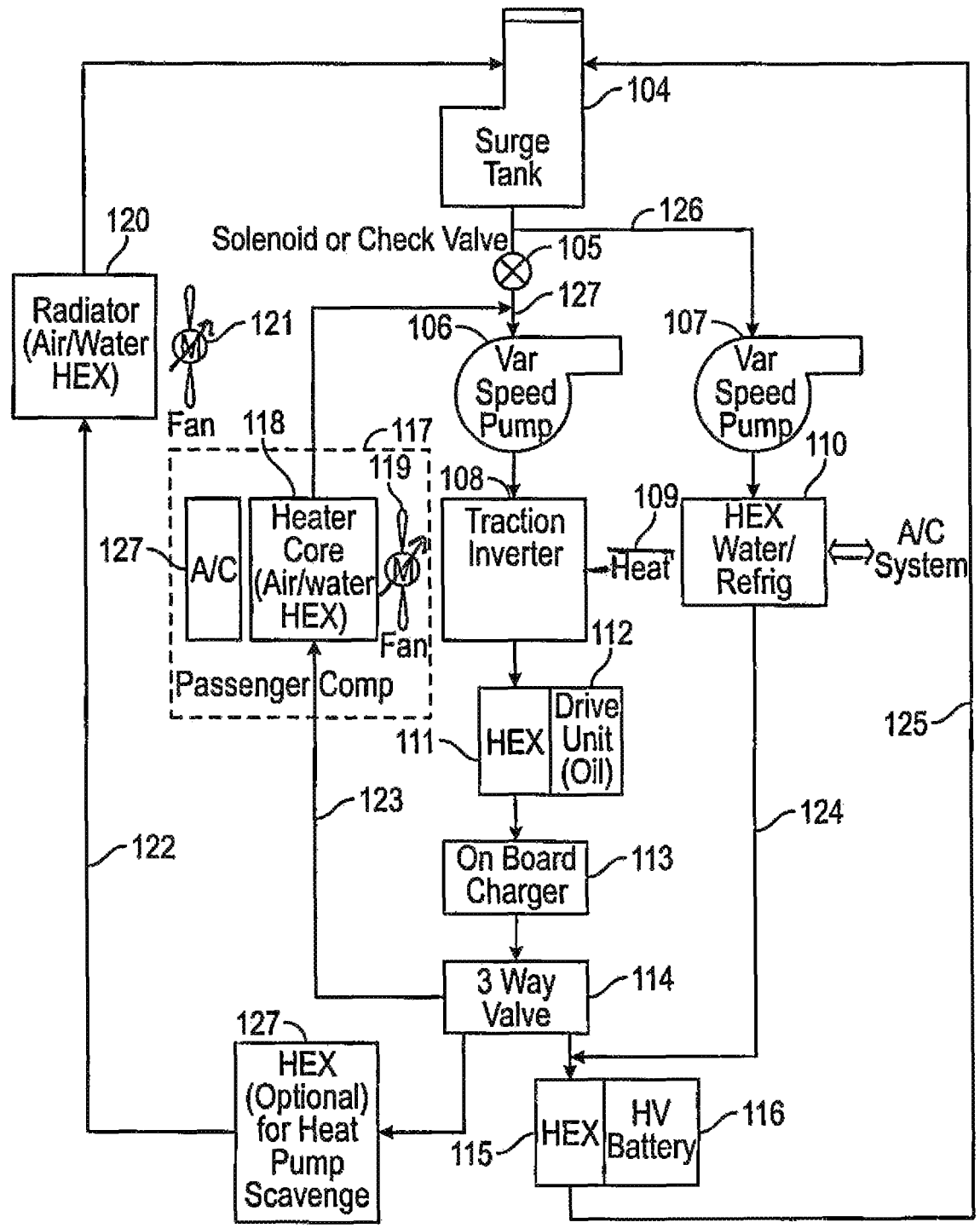
FIG. 10 depicts an embodiment of an electric vehicle heating system that uses the drive circuit of FIG. 9 or variation thereof.

FIG. 10 shows one embodiment of a claimed implementation of the of the claimed MOSFET-heated coolant loop. In a second embodiment, the Onboard Charger (and/or the DC-DC converter implied in that block of the diagram) is placed in the loop between pump 106 and the traction inverter 108. In one embodiment, the traction inverter 108 has heating-mode capable MOSFETS, turned on by the HEAT—signal 109. Operation is as follows, though other implementations of the electric vehicle heating system, and the sequence of, or presence or absence of devices in the loop, are possible to achieve the same outcome. The coolant in the reservoir, "surge tank" 104, feeds a variable speed coolant pump 106 through an opened valve 105. Valve 105 is optional and simplistically prevents backflow of heated coolant into the surge tank or coolant loop 126. In another embodiment it can be a check valve, in another embodiment a check valve that is closed by mild forces such as springs or magnets, and in another embodiment, it is omitted altogether where gravity is exploited or flows are designed and managed. Pump 106 then pushes coolant into the traction inverter 108, which contains at least one of the claimed devices previously described that can produce heat in the presence of an activating command or signal, in this embodiment HEAT—109.

Traction inverter 108 then passes heated coolant, in this embodiment the system strives for 130 degrees Fahrenheit at the inlet 123 of heater core 118 by controlling the HEAT-signal and pump flow rate, in other embodiments at higher temperatures such as 160° F., 170° F. or 180° F., to heat exchanger "HEX" 111 which serves to exchange heat with the electric motor and gearbox cooling and lubricating oil 112 in the vehicle drive unit(s). In some embodiments, multiple traction inverters 108 and drive unit HEX 111 are present and multiple coolant interconnections are possible. Suffice it to say that motor windings and gearboxes are tolerant of higher temperatures, so they are generally preceded in the coolant loop(s) by the inverter electronics. The heated coolant from HEX 111 then is routed to the Onboard Charger 113, which also includes the vehicle's DC-DC (~12V accessory power) module 113. In some embodiments these are separate boxes, in one embodiment they are combined, much as they are in the Nissan Leaf. Note that in vehicle operation the onboard charger is turned off and only the DC-DC module is active in most foreseeable instances. On-the-move-charging is possible (think air-to-air refueling), though, and the operation of the Onboard Charger 113 while the vehicle is in motion would simply generate more heat in the coolant and require less heat to be produced by the heating-enabled MOSFETs (typically only in the traction inverter), assuming the heat-producing MOSFET is not implemented in the Onboard Charger (or DC-DC converter) as an embodiment, which it could be in a further embodiment. In one embodiment, the external charging cable is liquid cooled and forms part of the Onboard Charger's heat generating elements. In one embodiment, an external charger produces excessive heat by any means, including by the method of the invention, or has a means of cooling, and heat is transferred to/from its coolant by means of a coolant-isolating HEX during external high speed DC charging to the vehicle's coolant to either warm the energy storage system, the occupant cabin or any combination thereof.

In one embodiment of FIG. 10, heated coolant is then routed from the onboard charger, 113, in one or more of three directions by a three-way valve 114. In another embodiment, a three way fitting with flow restrictors could be used at 114. In yet another embodiment, one or more of the three branches can have variable speed pumps to preferentially route higher or lower coolant flows in their path. In yet another design, flows are engineered to produce higher and lower flows in the different branched by such methods as cross-sectional areas and by use of flow restriction or enhancing devices and methods. For the purposes of heating the passenger cabin 117, heated coolant flows in line 123 to the vehicle's heater core, which is a liquid to air heat exchanger, which is assisted in transferring thermal energy to the passenger cabin air by variable, or quantized, speed fan 119. This process transfers heat from the coolant, to the occupant cabin air, which is then returned to junction 127 to complete the heating loop for the cabin. Any residual heat is reused in the next cycle of the loop, reducing the amount of heat needing to be generated by the heating switching devices incorporated into the traction inverter 108. If the cabin heating is included in the thermal accounting, the traction inverter becomes 100% efficient in that none of the energy from the battery is intentionally dumped overboard via the radiator 120 into the environment, unlike would be the case with prior implementations of traction inverters by those versed in the art and where heat pumps do not harvest the "waste" heat.

Another path the heated coolant can take after exiting the Onboard Charger 113 of FIG. 10 is through the heat exchanger 115 for the energy storage system, a high voltage lithium-based battery 116 in one embodiment. This is needed in cold ambient temperatures or for "preconditioning" the battery to reduce its internal resistance to enable faster, higher rate, battery charging or discharging in one embodiment. For warming these batteries for greater efficiency, the temperature only needs to be a minimum of 65F in this embodiment, though this temperature could vary depending on battery technology. For fast charging, or for higher discharge rates for high vehicle acceleration, in one embodiment, the battery is pre-heated to 130° F. to lower its internal resistance.

The battery HEX 115 of FIG. 10 is also fed by a second coolant loop, in one embodiment, for the purposes of either moderating the hot coolant exiting the Onboard Charger 113 and 3 way valve 114 if the cabin heater is on (in this embodiment, having a coolant inlet temperature of 130° F. at the heater core 118) to warm the battery to some intermediate temperature (mixing hot and cold as for bathwater—lithium batteries like the same temperatures humans do), or actually cooling the battery during charging or extremely hot ambient conditions. This second loop feeds coolant from surge tank 104 via branch 126 to a variable speed pump 107. The output flow of pump 107 then feeds a coolant/refrigerant heat exchanger, HEX 110, which allows an air conditioning system to cool the coolant when it is optionally activated. If inactive, the coolant simply passes through the HEX with its temperature relatively unchanged—this would be the case if the need to mix ambient temperature coolant with heated coolant arises for battery conditioning, typically when the cabin heat is on. If the cabin heat is not on, the heat from the heated switching devices can be modulated to turn the coolant temperature down, though some "cold" coolant mixing may still be needed. Temperature sensors or other thermal sensors in the system are not shown in FIG. 10 and their placement should be obvious to those practiced in the art and readily understood for various embodiments in keeping with the teachings herein. Hot and cold/cooled coolant are mixed at the inlet of the battery HEX 115 to heat or cool the battery to desired temperatures, then the coolant is returned to the surge tank 104.

Another path the heated coolant can take after exiting the Onboard Charger 113 of FIG. 10 is via loop 122 to a radiator 120, which exchanges heat from the coolant to ambient temperature. This loop would typically be used if no cabin heating is needed and where the vehicle electronics, such as traction inverter 108, DC-DC converter 113, or traction motor oil 112, need cooling. Note that in one embodiment, HV battery 116 cooling, apart from using the air conditioner HEX 110, is facilitated by activating this loop to cool the surge tank coolant which is also part of the battery cooling loop 126, 124, 125. The exchanger 120's efficacy is assisted by the vehicle's airstream when moving (shutters 18 in front of the radiator are optional to improve aerodynamic efficiency and are not shown for simplicity) and by a variable speed fan 120. The cooled coolant then is returned to surge tank 104. In some embodiments, a heat pump is used to scavenge heat sources for heating passenger cabins and modules, like the energy storage system, so an optional placement of a heat exchanger HEX 127 can be inserted into this coolant loop.

For systems like the Chevy Bolt EV, the embodiments described herein add one (optional) 3 way valve and eliminate: one pump, a 2 kW battery heater 5, its controller 8, and a 7 kW cabin heater 24 (GM 42691833 MSRP is $760.49) and its controller 25; resulting in reduced: vehicle weight, complexity, leaking coolant failures, and vehicle BOM costs by several hundred dollars per unit. In the case of the Nissan Leaf, elimination of the cabin heater (P/N B7413-00Q0K) MSRP, alone, is $1421.02. Approximately double the cost of the components can be realized as a reduction in sticker price of the vehicle, or the savings in cost can go directly to operating margins of the OEM, likely lifting those operating margins by very significant, double digit percentages.

For systems like the Tesla Model S, the embodiments described herein eliminate one pump, a battery heater and its controller 44, and a cabin heater 41. Tesla does not publish its parts prices, but those cited from the Chevrolet Bolt may serve as close approximations.

With reference to FIGS. 1-10, it should be appreciated that variations with other types of switching devices, other traction inverters including multilevel inverters and various numbers of phases, other driver circuit topologies including cascode amplifiers and stacked devices for high voltage capability, and other types of transistors and controlled switches, various types of sensors, various energy storage systems, various controllers and control algorithms for operating driver circuits and traction inverters and electric motors of various types are readily considered and further embodiments devised therefrom. Various paths and components for selectively directing switching device derived heating produced as described herein, in various vehicle systems, are readily devised in further embodiments, in keeping with the teachings herein.

In the event the inverter is limited in the power its switching devices can dissipate, in one instance 1 kW per switching device in the inverter and in another embodiment a total of 3 kW of heat generation, some embodiments can also invoke the "third state" in the vehicle charger, in some embodiments while the vehicle is not even charging, which can generate another kilowatt of heat energy with one or more switching devices operating in the third state despite the charger not switching its output devices. Further embodiments can employ other modules where high power switching devices are present and liquid cooled, whether onboard the vehicle or associated with the vehicle occasionally such as during charging. A separate command or signal equivalent to HEAT—can be used to control each module individually in one embodiment, in any plurality set, or collectively as one signal. The components being driven by the switching devices can be in their "off state" and still have heat generated by the switching devices that are "off", A signal can be implemented in either hardware or as a software state. In another embodiment, the contribution of each respectively is apportioned by controlling its percentage of the aggregate contribution of all heat sources.

Various embodiments could have an immobilizer. For example, an added gate in the "SIG" signal path can disable a traction inverter by means of a signal, one embodiment using an AND gate, with IMMOB—as an input. In another embodiment, the SRS (airbag) deployed signal is also used as an input to the AND gate, serving to also immobilize the vehicle in a crash. In some embodiments, the immobilization is latched logically, such that an extraordinary effort is required to reset the state of the immobilization to enable operation again. The "signal" and the logic can also be implemented purely in software or firmware in the inverter. The IMMOB-signal is only inactive (high) when a state is entered where a sequence such as a number, symbols, or letters, comprising a password, passcode, or security code/PIN has been correctly entered, in one embodiment. The control circuit in the inverter may be connected to receive this information by any communication means including CAN or other bus protocol messages, radio link such as Bluetooth or Wi-Fi, or by wired connection. Included in this is a means to enter and store the known code in the inverter from time to time and a means to restore that code to a "backdoor" code to allow entry reentry or initialization of the code. That means could also include a restricted, code entered, access protection. Such means can be constructed by software executing on a processor, firmware, hardware or combination thereof. The enclosure and construction of the inverter is such that extensive time is required (e.g., by a hostile user) to access any means to bypass the immobilization circuitry or software. In another embodiment, a signal is received from the SRS (Supplemental Restraint System, aka "airbags") crash detection system to disable operation of the inverter until it can be re-enabled by service technicians or the factory.

Figure 11:
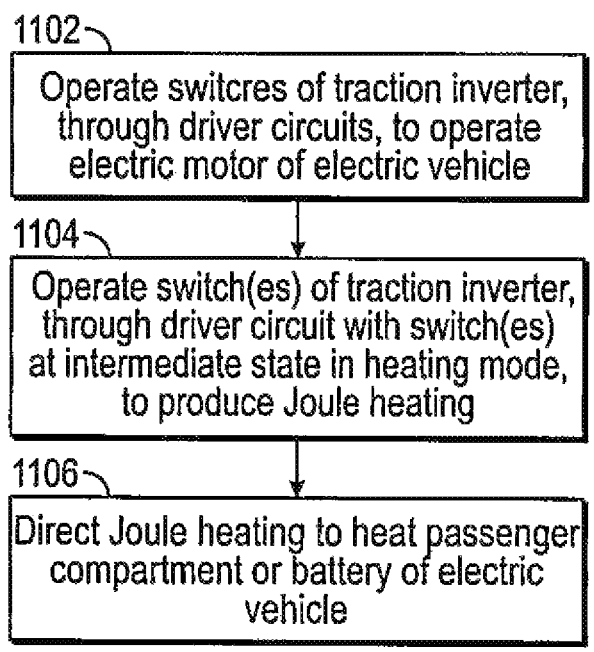
FIG. 11 is a flow diagram of a method for an electric vehicle heating system in accordance with some embodiments.

FIG. 11 depicts a method that can be practiced by embodiments described herein. More specifically, the method can be practiced by electronic circuitry, processors (including controllers), and various combinations of software executing on a processor, firmware, and hardware as readily devised in keeping with the teachings herein. The method can be embodied in tangible, computer-readable media having instructions for execution by a processor, or plurality thereof, for example a processor in an electric vehicle heating system as described herein.

In an action 1102, the system operates switches of a traction inverter, through driver circuits, to operate the electric motor of an electric vehicle. See, for example FIGS. 6-9 for various traction inverters and driver circuits, and variations thereof. It should be appreciated that the references to operating switches of the inverter as the driver circuits may referred to as controlling, managing, etc., the switches. In addition, the embodiments are not limited to pulling heat from the traction inverter, as the embodiments may be extended to the charging circuitry for an energy storage system as discussed above.

In an action, 1104, the system operates one or more switches of the traction inverter, or the charging circuitry of the energy storage system, through the respective driver circuit(s), with the switch(es) at an intermediate state in a heating mode, to produce switching device heating. See, for example FIGS. 6-9 for various traction inverters and driver circuits, and variations thereof, and description of an intermediate state and heating mode and related mechanisms.

In an action 1106, the system directs switching device heating produced to heat the passenger compartment or the energy storage system of the electric vehicle. See, for example FIG. 11, for a fluid path, selection valves and heat exchangers suitable for various embodiments of directing such switching device heating, and variations thereof. While the embodiments disclose selecting a path for the fluid or heating means it should be appreciated that this is not meant to be limiting as the path may be determined through a passive manner, such as a pump being on or off as opposed to an active manner such as valve movement. In some embodiments the heat exchanger may include ductwork supplying air flow for cooling or warming a passenger cabin and/or energy source.

In some embodiments a method of heating a system requiring a narrow range of temperature operation in environments requiring heat generation is provided. The method may be integrated into any power switching apparatus, including such topologies as switching power supplies, DC motor controls, power factor correction circuits, motor drivers, actuator controls, etc. The apparatus may be integrated into satellites or another suitable apparatus that may utilize the heating embodiments described herein. Switching devices for the apparatus operated through a driver circuit may be utilized as described above. At least one of the plurality of switching devices of the apparatus may be operated though the driver circuit with the switching device at an intermediate state between fully-turned-off and fully-turned-on, in a heating mode to produce heating, as described above. The heating produced in the heating mode is directed or controlled to heat the apparatus. The switched device, or its load, does not need to be "on" for heat to be produced. It should be appreciated that in some embodiments, the device may be in a not fully on state for heat production and is not limited to a not fully off state. That is, the embodiments extend to not fully driving the devices so that resistive channels are heated by $I^2R$ losses vs. channel throttling V*I losses.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A heating system, comprising:
a circuit to operate a switching device at multiple states, wherein the multiple states include a first state between fully-turned-off and fully-turned-on, to produce heat in the switching device and a second state where the switching device is at one of a fully-turned-off state and a fully-turned-on state for an energy storage system, wherein the circuit is configured to cycle the first state and the second state to provide for heating of a cabin of an electric vehicle (EV) and for propulsion of the EV.

2. The system of claim 1, wherein the energy storage system includes an inverter.

3. The system of claim 2, wherein the inverter is disposed in a thermal transport path having at least one route to a heat exchanger for heating the energy storage system.

4. The system of claim 1, further comprising:
a controller to provide signals to the circuit to operate an inverter included with the energy storage system.

5. The system of claim 1, further comprising:
the circuit having a current sensor; and
a controller, to sense current through the switching device via the current sensor and adjust a control terminal of the switching device to adjust current of the first state.

6. The system of claim 1, further comprising:
the circuit having a thermal sensor; and
a controller, to adjust a control of the circuit based on sensing via the thermal sensor.

7. The system of claim 1, wherein the switching device is included in a semiconductor based power supply system.

8. The system of claim 1, wherein the switching device comprises one of a MOSFET (metal oxide semiconductor field-effect transistor) or an IGBT (insulated gate bipolar transistor).

9. The system of claim 1, wherein the switching device is integrated into one of a land based vehicle, an air based vehicle or a water based vehicle.

10. An electric vehicle (EV) heating system, comprising:
an inverter having a plurality of switching devices for operating an electric motor; and
a circuit coupled to one of the plurality of switching devices to:
cycle operation of the one of the plurality of the switching devices between a first state and a second state, the first state being between fully-turned-off and fully-turned-on for a heating mode and the second state where the switching device is at one of a fully-turned-off state and a fully-turned-on state;
operate the switching device to have a fully-turned-off state and a fully-turned-on state in a main function mode for the inverter; and
cycle the heating mode and the main function mode for combined heating and main function operation of the inverter.

11. The system of claim 10, wherein:
the inverter comprises a three-phase inverter having a high-side switch and a low-side switch for each phase.

12. The system of claim 10, wherein:
the inverter comprises a multilevel inverter comprising additional switching devices.

13. The system of claim 10, further comprising:
a controller coupled to the circuit to operate the inverter for both operating the electric motor and heating one of a passenger compartment or an energy storage system.

14. The system of claim 10, further comprising:
at least one sensor coupled to one of the plurality of switching devices; and
a controller, to receive an output of the at least one sensor and adjust a control terminal of at least one of the plurality of switching devices to adjust the intermediate state.

15. The system of claim 10, further comprising:
a heat exchanger for heating a passenger compartment.

16. The system of claim 10, further comprising:
a heat exchanger for heating an energy storage system.

17. A method, comprising:
operating each of a plurality of switching devices of a power supply system through a respective circuit;
operating at least one of the plurality of switching devices of the power supply system through its respective circuit with the switching device at an intermediate state between fully-turned-off and fully-turned-on to produce heating; and
cycling a main function mode and a heating mode through each of the respective circuits for combined main function operation of the power supply system and heating function operation.

18. The method of claim 17, wherein producing the heating comprises managing a pathway for traversal through one of a first heat exchanger and a second heat exchanger.

19. An electric vehicle (EV) safety system, comprising:
a circuit to operate a switching device at multiple states, wherein the multiple states include a first state between fully-turned-off and fully-turned-on, to produce heat in the switching device and a second state where the switching device is at one of a fully-turned-off state and a fully-turned-on state for an energy storage system, wherein the circuit is operable to transition from the second state to the first state to provide for thermal dissipation of electrical energy responsive to a signal detected from a supplemental restraint system of the EV.

* * * * *